No. 852,925. PATENTED MAY 7, 1907.
J. CARR.
CAR DOOR.
APPLICATION FILED MAR. 31, 1906.

Witnesses
C. M. Catlin
J. M. Copenhaver

Inventor
James Carr
By Benj. R. Catlin
Attorney

UNITED STATES PATENT OFFICE.

JAMES CARR, OF MEMPHIS, TENNESSEE.

CAR-DOOR.

No. 852,925.  Specification of Letters Patent.  Patented May 7, 1907.

Application filed March 31, 1906. Serial No. 309,175.

*To all whom it may concern:*

Be it known that I, JAMES CARR, a citizen of the United States, residing at Memphis, in the county of Shelby and State of Tennessee, have invented new and useful Improvements in Car-Doors, of which the following is a specification.

This invention relates to car doors and has for its object to provide a sliding door with means for holding it securely in place when closed, which shall be easily rendered inoperative, the whole construction being adapted to induce ventilation of the car interior.

Figure 1:
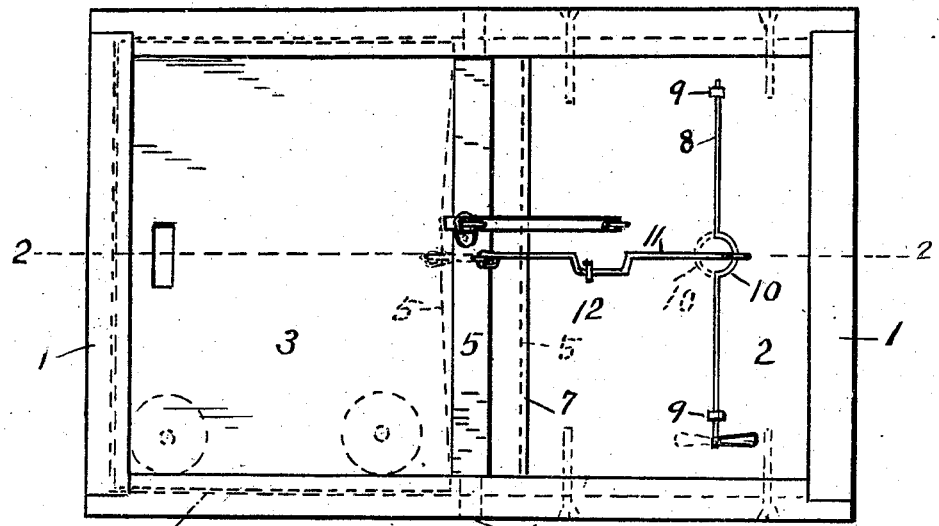
Figure 2:
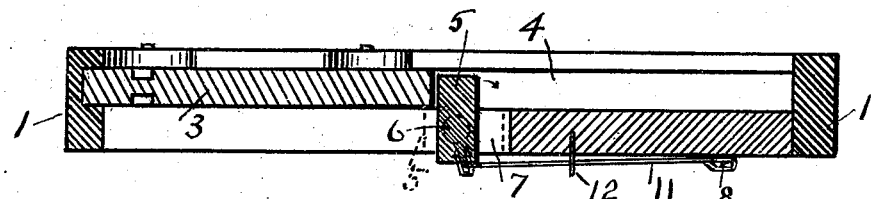
Figure 3:
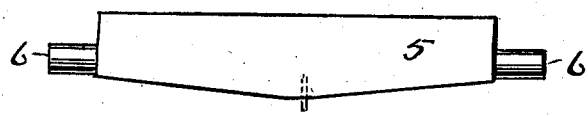

In the accompanying drawing which forms a part of this specification—Figure 1 is a plan view; Fig. 2 is a section on line 2—2 of Fig. 1; Fig. 3 is a side view of a pivotal bar.

Numeral 1 denotes a car door frame and 2 a fixed panel. 3 denotes a panel which can be slid in ways 4 to a situation behind the fixed panel 2.

5 is a bar supported in the frame by pivots 6 and situated between the panels. When held in operative position by a suitable lock or fastening it overlaps the sliding panel on one side and is held remote from the fixed panel on the other thereby leaving a ventilating opening 7; when unlocked and turned it is situated in the plane of the fixed panel and at the side of the path of the sliding panel.

8 is a bar supported in staples 9 and provided with a handle. It has a bend 10 to which is loosely connected a rod 11 pivoted to the bar 5 movable through a staple or guide 12. The bar 8 can be turned or oscillated by means of the connecting rod with the effect to turn bar 5 either against or away from the sliding panel as desired.

Having thus described the invention what I claim is—

1. The combination of the door frame, the fixed panel, the sliding panel, said panels being situated in different planes, the bar pivoted in the frame intermediate the adjacent edges of the panels, and means to lock the bar to the fixed panel and in the path of the sliding panel and against the same, said bar when thus locked having a thickness in a direction parallel with the panels less than the distance between said edges whereby a ventilating space is left between the fixed panel and the bar.

2. The combination of the door frame, the fixed panel, the sliding panel, said panels being situated in different planes, the bar pivoted in the frame, and means to lock the bar to the fixed panel and in the path of the sliding panel and against the same and constituting the sole lock for said sliding panel, said bar having a width approximately equal to the distance between the proximate edges of the panels when fully separated and a smaller transverse dimension, all substantially as set forth, whereby it can be adjusted to either partially or wholly close said space.

3. The combination of the door frame, the fixed panel, the sliding panel, said panels being situated in different planes, the bar pivoted to the frame, and means to lock the bar to the fixed panel and in the path of the sliding panel and against the same and constituting the sole lock for said sliding panel, said bar having a width approximately equal to the distance between the proximate edges of the panels when fully separated and a smaller transverse dimension, all substantially as set forth, whereby it can be adjusted to either partially or wholly close said space, and means supported on one of the panels for turning the bar on its pivot.

4. The combination of the door frame, the fixed panel, the sliding panel, said panels being situated in different planes, the bar pivoted in the frame, and means to lock the bar to the fixed panel and in the path of the sliding panel and against the same and constituting the sole lock for said sliding panel, said bar having a width approximately equal to the distance between the proximate edges of the panels when fully separated and a smaller transverse dimension, all substantially as set forth, whereby it can be adjusted to either partially or wholly close said space, and means supported on one of the panels for turning the bar on its pivot, said means comprising a crank arm situated on a dead center in either position of the pivoted bar.

In testimony whereof I have hereunto set my hand in presence of two subscribing witnesses.

JAMES X CARR.
(his mark)

Witnesses:
W. K. POSTON,
P. A. MEATH.